US012128944B2

(12) United States Patent
Chen (10) Patent No.: US 12,128,944 B2
(45) Date of Patent: Oct. 29, 2024

(54) CHILD CARRYING DEVICE

(71) Applicant: DYNAMIC MOTION, LLC, Richmond, VA (US)

(72) Inventor: Yanfu Chen, Dongguan (CN)

(73) Assignee: Dynamic Motion, LLC, Richmond, VA (US)

( * ) Notice: Subject to any disclaimer, the term of this patent is extended or adjusted under 35 U.S.C. 154(b) by 138 days.

(21) Appl. No.: 17/849,258

(22) Filed: Jun. 24, 2022

(65) Prior Publication Data

US 2022/0410958 A1 Dec. 29, 2022

(51) Int. Cl.
*B62B 7/12* (2006.01)
*B62B 7/06* (2006.01)

(52) U.S. Cl.
CPC ............... *B62B 7/126* (2013.01); *B62B 7/06* (2013.01)

(58) Field of Classification Search
CPC ........... B62B 7/126; B62B 7/06; B62B 7/064; B62B 7/123; B62B 7/068; B62B 9/20; B62B 3/007
See application file for complete search history.

(56) References Cited

U.S. PATENT DOCUMENTS

| | | | | |
|---|---|---|---|---|
| 2,783,053 A * | 2/1957 | Sheldrick | ................. | B62B 7/08 280/643 |
| 3,689,099 A * | 9/1972 | Patterson | ................. | B62B 7/08 280/38 |
| 4,265,466 A * | 5/1981 | Kassai | ..................... | B62B 7/08 280/47.38 |
| 4,648,651 A * | 3/1987 | Hawkes | .................. | B62B 9/104 297/27 |
| 4,836,573 A * | 6/1989 | Gebhard | .................. | B62B 9/26 280/47.38 |
| 6,805,406 B1 * | 10/2004 | Jansen | .................... | B62B 7/123 297/341 |
| 6,830,260 B2 * | 12/2004 | Everett | .................... | B62B 9/20 280/642 |
| 7,338,127 B2 * | 3/2008 | Church | .................. | B62B 9/108 297/118 |
| 7,726,683 B2 * | 6/2010 | Moriguchi | ............. | B62B 7/123 280/47.38 |
| 8,915,516 B2 * | 12/2014 | Yang | ........................ | B62B 9/12 280/643 |
| 9,221,487 B2 * | 12/2015 | Doucette | ................ | B62B 7/123 |
| 10,858,030 B2 * | 12/2020 | Horst | ..................... | B62B 9/142 |
| 11,292,500 B2 * | 4/2022 | Fan | ........................... | B62B 7/08 |

FOREIGN PATENT DOCUMENTS

| | | | | |
|---|---|---|---|---|
| DE | 3008011 A1 * | 9/1981 | | |
| DE | 3709712 A1 * | 10/1987 | | |
| DE | 10019731 A1 * | 10/2001 | ............ | B62B 7/123 |
| JP | 2001314263 A * | 11/2001 | .......... | A61G 5/0866 |

* cited by examiner

*Primary Examiner* — Steve Clemmons
(74) *Attorney, Agent, or Firm* — Bernard Pike; Pike IP Law, PLLC (57) ABSTRACT

The invention relates to a child carrying device that includes a stroller configuration and a wagon configuration. The child carrying device comprises a support frame that may be rotated from an angled orientation in the stroller configuration to a substantially horizontal position in the wagon configuration.

16 Claims, 6 Drawing Sheets

CHILD CARRYING DEVICE

TECHNICAL FIELD

The invention relates to the technical field of child carrying devices, in particular to a baby carriage frame that may be converted between a stroller configuration and a wagon configuration.

BACKGROUND

Child carrying devices include wagons and strollers. Each of these child carrying devices has advantages. Stollers have been traditionally used to carry children. Strollers include a child seat and are easily maneuverable, have a small footprint, many are light weight, and may be folded so it occupies a small space so it may be stored easily in a car truck. More recently parents have been purchasing wagons to safely carry their children. Wagons can easily carry two children, are sturdier, and can carry a heavier load than strollers.

Many parents are buying both a stroller and a wagon to use in different environments and for different purposes. There is a need for a child carrying device that may be converted from a stroller to a wagon. There is a further need for a child carrying device that may be converted from a stroller to a wagon and still be folded to a small size to be easily stored and transported.

SUMMARY OF THE INVENTION

A child carrying device that may be converted between a stroller configuration to a wagon configuration is described. An embodiment of the child carrying device comprises a support frame and a folding assembly. The support frame supports a fabric cover that may be manipulated into a stroller seat structure and a wagon structure by the connecting or disconnecting straps with buckles, folding frame members or panel members, or by another structure. The support frame may comprise a handle and a seat frame connected to the handle. In some embodiments, the fabric cover may be attached to the seat frame.

In one embodiment, the folding assembly comprises a connecting member slidingly connecting the support frame to the folding assembly. The folding assembly may comprise the connecting member, a front leg tube, a rear leg tube, and a hinge rotatably connecting the connecting member to at least one of the front leg tube and the rear leg tube. The child carrying device may be converted between the wagon configuration and the stroller configuration by unlocking the support frame, rotating the connecting member relative to the rear leg tube, and sliding the support frame relative to the connecting member.

Another embodiment of the child carrying device may comprise a linkage bar hingedly connected between the front leg tube and the support frame and a sliding tube connected between the linkage bar and the rear leg tube.

The child carrying device may be locked in either the stroller configuration or the wagon configuration by a lock assembly. The lock assembly may be at least partially within the support frame, for example, and be activated by a conversion lock release such as, but not limited to, a switch or button in the handle.

In a more specific embodiment of the lock assembly, the lock assembly comprises a conversion lock release, a first cable connected to the conversion lock release, a reset piece, a wagon lock pin connected to the reset piece, a second pull wire connected to the reset piece, and a support frame locking member connected to the second pull wire. The reset piece controls retraction of the wagon lock pin and unlocking of the support frame locking member upon manipulation of the conversion lock release. The wagon lock pin may be received within a wagon lock slot in the connecting member to lock the child carrying device in the wagon configuration and removed from the wagon lock slot by manipulation of the conversion lock release.

The support frame locking member may be biased by biasing member 36A, for example, to lock the support frame to the stroller locking seat on the front leg to lock the child carrying device in the stroller configuration.

In a still further embodiment, a child carrying device comprises a support frame, the support frame includes a handle and a seat frame connected with the handle and the handle has a stroller locking position and a wagon locking position.

The folding assembly is connected to the support frame by connecting member slidably arranged on the handle, wherein one of the front leg tube and the rear leg tube is connected to the connecting member, the other of the front leg tube and the rear leg tube is hinged to the connecting member with a hinge.

The lock assembly is installed on the handle, and the lock assembly is used to control locking and unlocking of the handle to the stroller locking seat and to control the locking of the connecting member to the handle in the wagon configuration.

For the child carrying device described above, thus can be configured such that the stroller locking seat and the stroller locking member are clamped into a stroller configuration or the connecting member and the wagon locking pin are clamped to form a wagon configuration.

The folding assembly also comprises a locking/unlocking system. The locking/unlocking system comprises a sliding connector defining an aperture that receives the folding sliding tube and pivotally connected to the rear leg tube.

In one of the embodiments, a folding button is provided on the sliding connector and the folding button is used to unlock the folding sliding tube from the sliding connector to fold the folding assembly for storage or transport.

In one of the embodiments, the support frame locking member is slidably arranged on the handle and a biasing member 36A is arranged between the support frame locking member and the handle to bias the support frame locking member toward the stroller locking seat in the stroller configuration.

In one of the embodiments, the connecting member includes a sliding part, a mounting part connected to the sliding part, and a hinge connected to the mounting part. The sliding part may be slidably connected to the handle. The front leg tube may be connected with the mounting part and the rear leg tube may be hinged with the hinge part in one embodiment.

In another embodiment, the child carrying device further includes a pull handle for the wagon configuration and one end of the pull handle is connected to the folding assembly.

In still another embodiment, the handle is arranged in a U-shaped tubular structure, the seat frame is arranged in a rectangular ring structure, and the handle is connected and fixed to both sides of the seat frame.

In order to make the above objectives, features and advantages of the present invention more obvious and understandable, the specific embodiments of the present invention will be described in detail below with reference to the accompanying drawings. In the following description, many specific details are explained in order to fully understand the present invention. However, the present invention can be implemented in many other ways different from those described herein, and those skilled in the art can make similar improvements without departing from the connotation of the present invention. Therefore, the present invention is not limited by the specific embodiments disclosed below.

In the description of the present invention, it should be understood that the terms "center", "longitudinal", "transverse", "length", "width", "thickness", "upper", "lower", "front", "Back", "Left", "Right", "Vertical", "Horizontal", "Top", "Bottom", "Inner", "Outer", "Clockwise", "Counterclockwise", "Axial", "Radial", "Circumferential", etc. indicate the orientation or positional relationship based on the orientation or positional relationship shown in the drawings, and are only for the convenience of describing the present invention and simplifying the description, rather than indicating or implying the pointed device or The element must have a specific orientation, be constructed and operated in a specific orientation, and therefore cannot be understood as a limitation of the present invention.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one of the features. In the description of the present invention, "plurality" means at least two, such as two, three, etc., unless otherwise specifically defined.

In the present invention, unless otherwise clearly specified and limited, the terms "installed", "connected", "connected", "fixed" and other terms should be understood in a broad sense, for example, it can be a fixed connection or a detachable connection., Or integrated; it can be mechanically connected or electrically connected; it can be directly connected or indirectly connected through an intermediary, it can be the internal communication of two components or the interaction relationship between two components, unless otherwise specified The limit. For those of ordinary skill in the art, the specific meaning of the above-mentioned terms in the present invention can be understood according to specific circumstances.

In the present invention, unless expressly stipulated and defined otherwise, the "on" or "under" of the first feature on the second feature may be in direct contact with the first and second features, or the first and second features may be indirectly through an intermediary. touch. Moreover, the "above", "above" and "above" of the first feature on the second feature may mean that the first feature is directly above or obliquely above the second feature, or it simply means that the level of the first feature is higher than the second feature. The first feature "below", "below" and "below" the second feature can mean that the first feature is directly below or obliquely below the second feature, or it simply means that the level of the first feature is smaller than the second feature.

It should be noted that when an element is referred to as being "fixed to" or "disposed on" another element, it can be directly on the other element or a central element may also be present. When an element is considered to be "connected" to another element, it can be directly connected to the other element or an intermediate element may be present at the same time. The terms "vertical", "horizontal", "upper", "lower", "left", "right" and similar expressions used herein are for illustrative purposes only, and do not mean the only implementation.

DESCRIPTION

Child carrying devices are typically sold either as a stroller or a wagon. The described carrying device, however, comprises a frame that may be converted between a stroller configuration and a wagon configuration. In some embodiments, the child carrying device further comprises a folded configuration for storage or transport of the child carrying device.

The child carrying device comprises a support frame and a folding assembly. The support frame may be converted from the stroller configuration to the wagon configuration relative to the folding assembly. In one embodiment, the support frame is configured to rotate and slide relative to the folding assembly for conversion to allow the stroller configuration to have the support frame at the proper angle for a stroller seat. In the wagon configuration of such an embodiment, the support frame is locked in a substantially horizontal and, in the stroller configuration, the support frame is locked at an angle between horizontal and vertical.

The support frame supports fabric material that may be convert from a typical wagon structure to a typical stroller seat structure. The stroller seat structure comprises a seat bottom and a seat back.

The folding assembly comprises a front wheel frame, a rear wheel frame, front wheels, rear wheels, and a folding mechanism and locking mechanism for converting the folding structure from the in-use configuration to the folded configuration.

The support frame further comprises a handle, and a seat frame connected to the handle. The connecting member of the folding assembly connects the support frame to the folding assembly. In one embodiment, the folding assembly comprises a hinge joint rotatably connecting the connecting member and the support frame to the folding assembly. The connecting member may define a slot or aperture that receives a frame member of the support frame. In this manner, the support frame is slidingly connected to the connecting member and the connecting member may be rotated on the folding assembly.

The folding assembly may further comprise a linkage bar that is pivotally connected to the folding assembly and the support frame. The linkage bar assists in supporting the support frame in the desired position and facilities converting the child carrying device between the stroller configuration, the wagon configuration, and the folded configuration.

The folding assembly comprising a connecting member slidingly connecting and sliding the support frame relative to the connecting member enables converting the child carrying device from the stroller configuration to the wagon configuration. In the embodiment shown, the baby carrying device comprises a left connecting member, a right connecting member, a right linkage bar, and a left linkage bar. The linkage bar may be pivotally connected between the front leg tube and the support frame. In one embodiment, one end of the linkage bar is pivotally connected to the support frame, the other end of the linkage bar is pivotally connected to the sliding tube connector, and the front leg tube is pivotally connected to the linkage bar between the support frame and the sliding tube connector. This mechanical linking between the support frame, front leg tube, and the sliding tube connector causes the wheelbase of the child carrying device to be reduced in the stroller configuration and increased in the wagon configuration as the support frame is moved within and relative to the connecting member.

Figure 1:
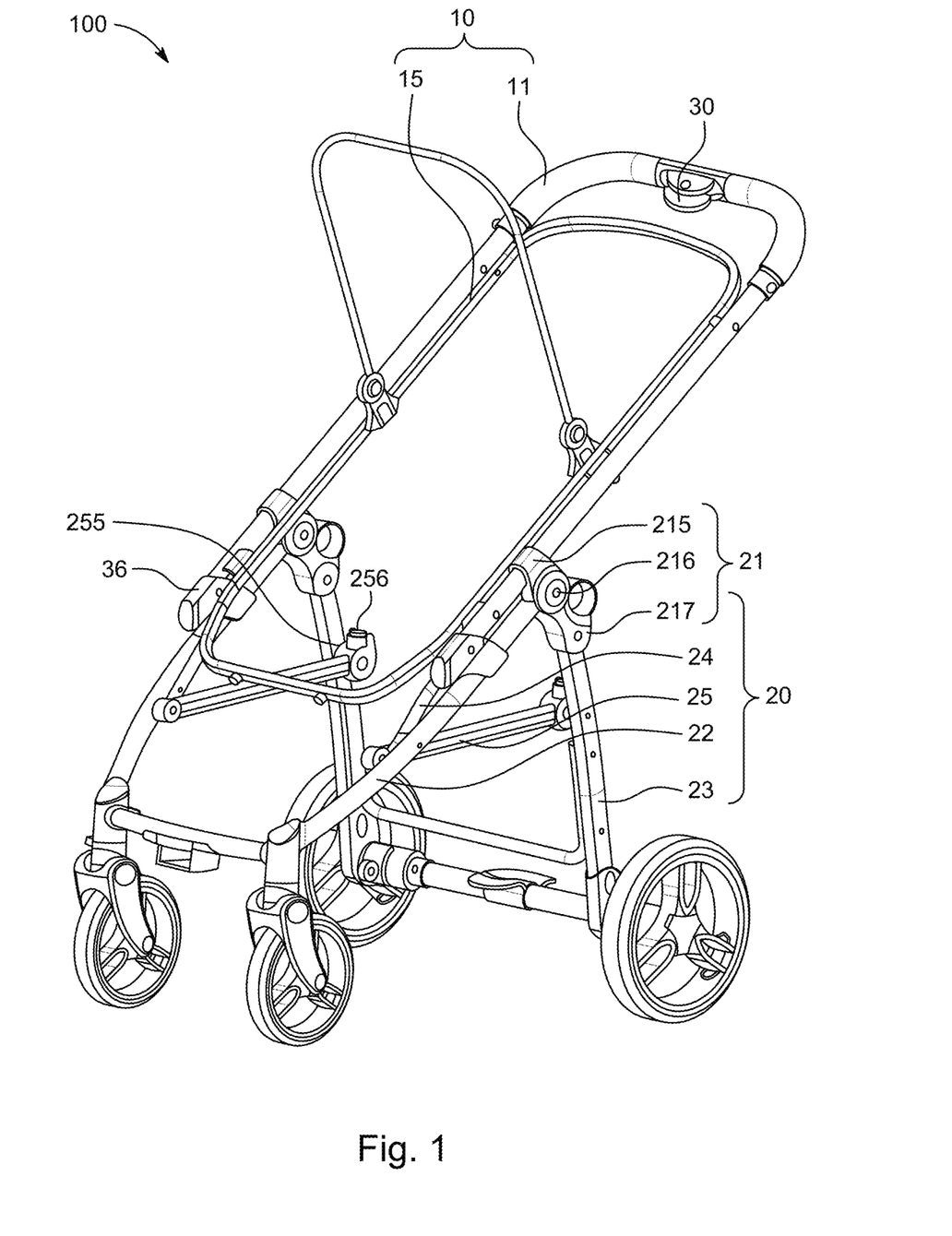
FIG. 1 is a schematic structural diagram of a child carrying device in a stroller configuration according to an embodiment of the present invention.
Figure 2:
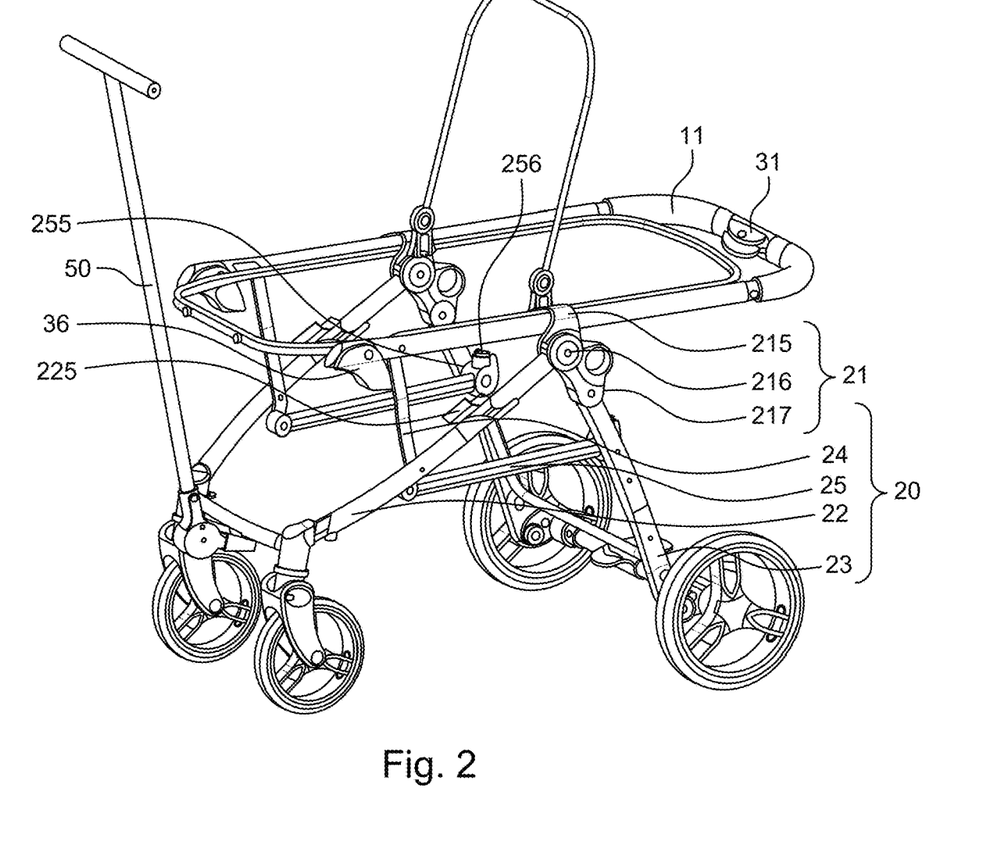
FIG. 2 is a schematic structural diagram of the child carrying device of FIG. 1 in a wagon configuration.
Figure 3:
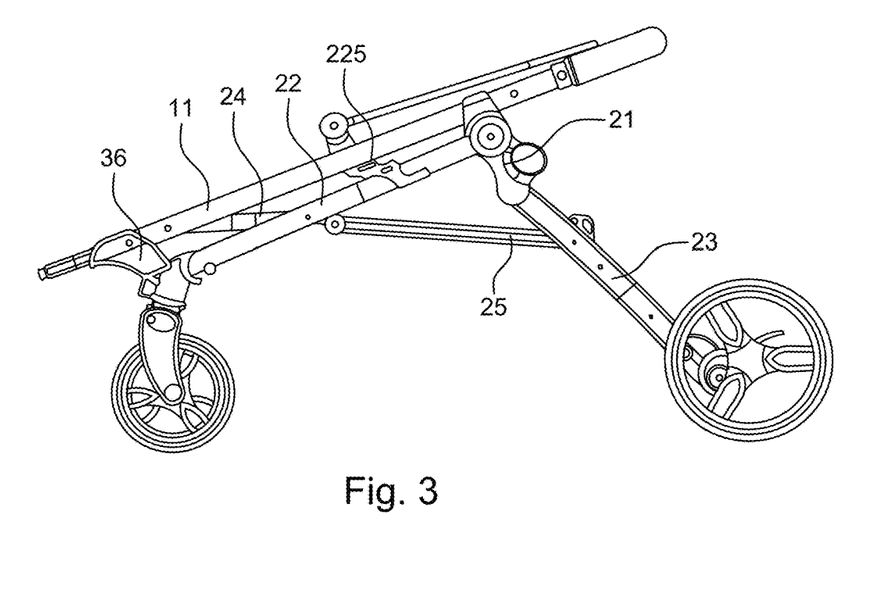
FIG. 3 is a schematic diagram of the structure of the child carrying device of FIG. 1 during the folding process.
Figure 4:
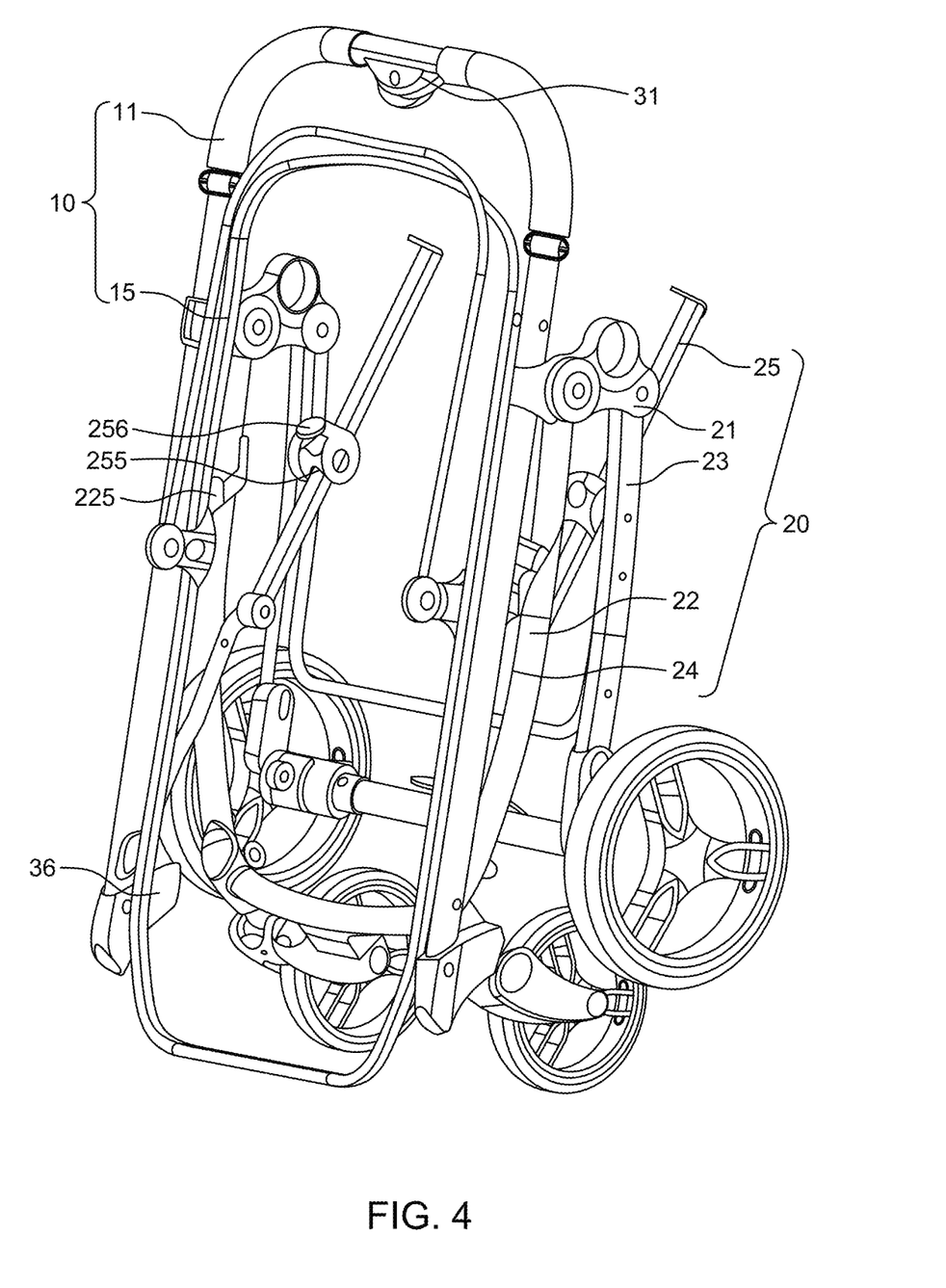
FIG. 4 is a schematic structural diagram of the child carrying device of FIG. 1 in a folded state.
Figure 5:
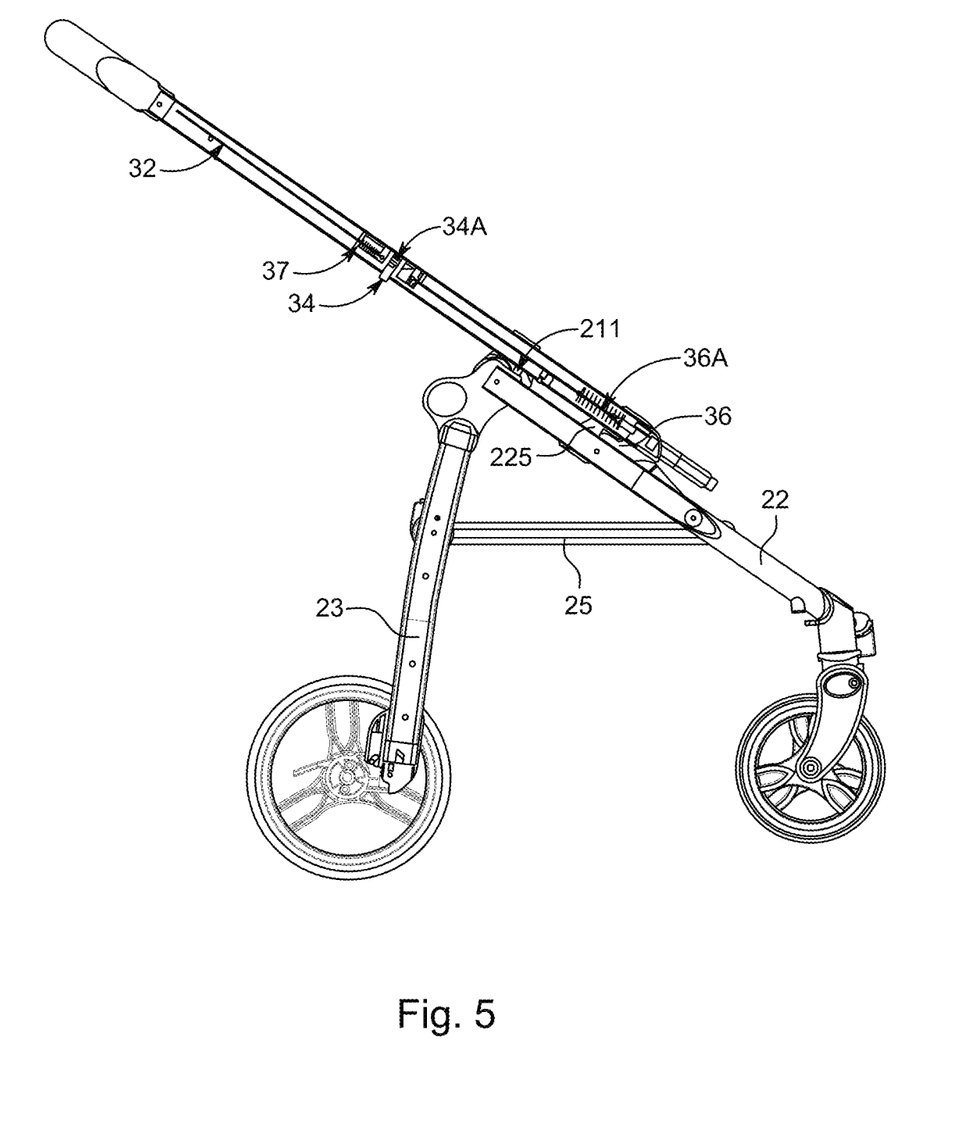
FIG. 5 is a schematic cross-sectional view of the child carrying device of FIG. 1.

To convert from the wagon configuration (FIG. 2) to the stroller configuration (FIG. 5), the front of the support frame slid rearward within the connecting member causing the linkage member to rotate the support frame toward the front leg tube to engage into a locking seat for receiving the support frame. The support frame comprises a support frame lock member configured to lock the support frame to the locking seat in the stroller configuration. The support frame lock member may be biased to the locked position wherein the support frame lock engages with the locking seat to retain the child carrying device in the stroller configuration. The support frame lock member is slidably arranged on the handle, and a biasing member is arranged between the stroller holder and the handle.

In another embodiment, the child carry device comprise a conversion lock assembly that is configured to lock the child carrying device in the stroller configuration and the wagon configuration. The conversion locking assembly may also unlock the stroller frame from the folding assembly to allow conversion between the wagon configuration, the stroller configuration, and/or the folded configuration.

In one embodiment, the conversion locking assembly comprises a conversion lock release, a first cable connected to the conversion lock release, a top seat, a wagon lock pin connected to the top seat, a second pull wire connected to the top seat, and a support frame locking member connected to the second pull wire; the wagon lock pin and the stroller lock pin are installed on the handle.

The folding sliding connector slidingly connects the sliding tube to the rear leg tube. Additionally, the sliding connector and the rear leg tube are pivotally connected. The folding sliding connector has a folding locking mechanism that locks the folding assembly in the unfolded configuration to support the wagon configuration or the stroller configuration on the wheels. The folding sliding connector comprises a folding lock assembly, the folding assembly is configured to unlock the folding assembly. The folding lock assembly may comprise a button for unlocking the folding assembly.

The locking assembly comprises a wagon locking assembly that locks the support frame in the wagon configuration such as, but not limited to, a wagon locking slot defined in the connecting member and a wagon locking pin 34 that protrudes and is biased out of the support frame by biasing member 34A, for example.

In one embodiment of the child carrying device, the connecting member defines a sliding aperture and comprises a mounting part and a hinge part pivotally connected to the mounting part. The handle is slidably received within the sliding aperture. At least one of the front leg tube and the rear wheel tube is connected with the mounting part.

The child carrying device may comprise a pull handle for use in the wagon configuration. The pull handle may rotatably connected to the folding assembly.

Figure 6:
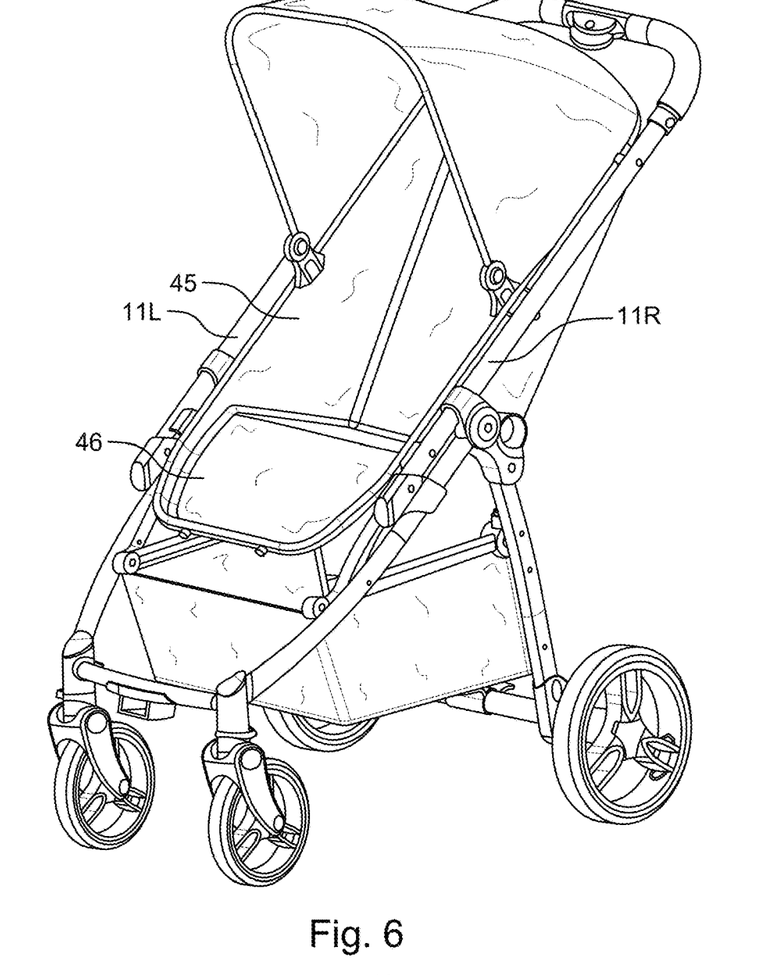
FIG. 6 depicts the child carrying device in the stroller configuration with the fabric cover configured for a stroller seat.
Figure 6A:
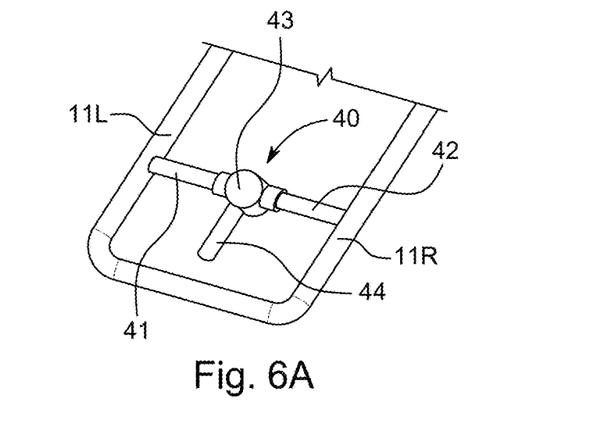
FIG. 6A depicts the stroller seat supports for configuring the stroller seat from the fabric cover in the stroller configuration of the child carrying device of FIG. 1.
Figure 7:
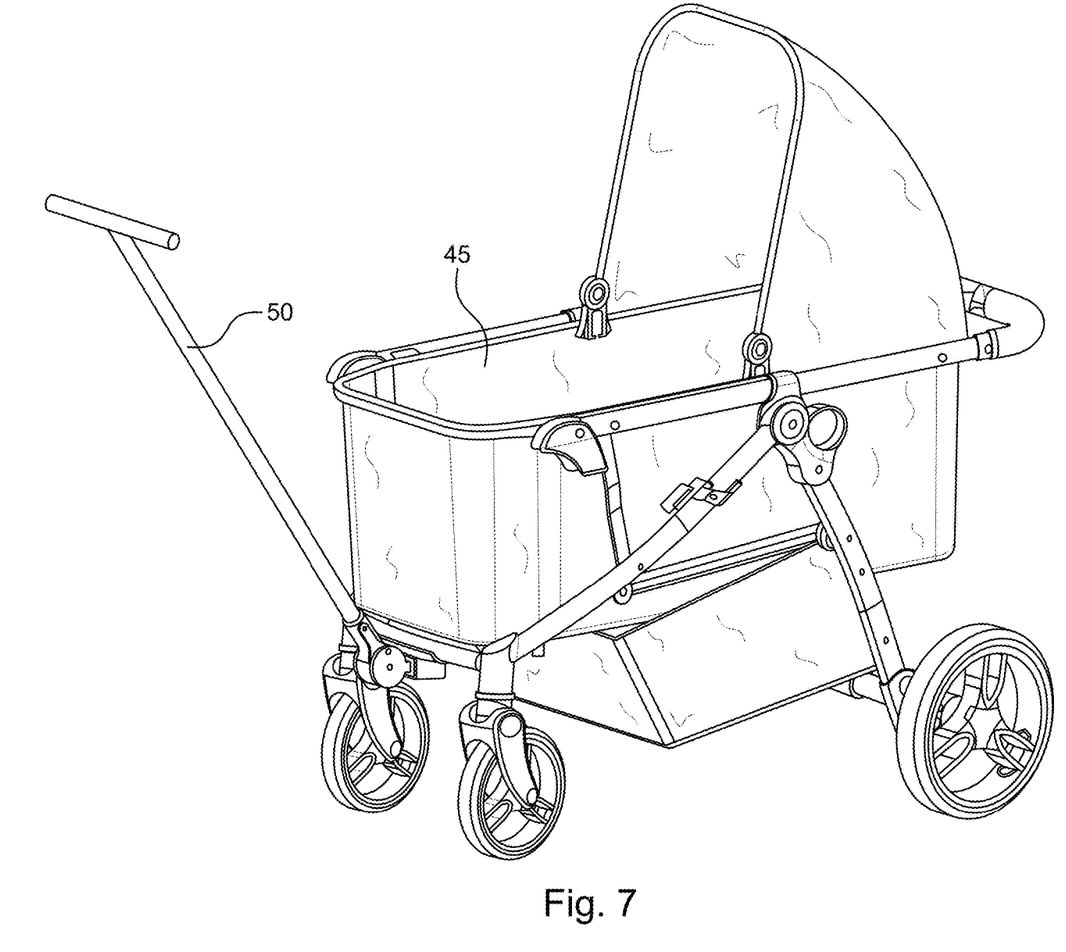
FIG. 7 depicts the child carrying device in the wagon configuration with the fabric cover configured for a wagon bed.

Referring to FIGS. 1 to 7, an embodiment of the child carrying device 100 comprises a support frame 10, a folding assembly 20 connected to the support frame 10, and a locking assembly installed on the handle 11 of the support frame 10. The child carrying device 100 may be converted between a stroller configuration (FIG. 6) and a wagon configuration (FIG. 7). The stroller configuration is used for infants push a child and the wagon configuration is used for pulling one or two children and/or transporting articles. With the child carrying device in the wagon configuration, support frame may be horizontal to facilitate the hauling of items. Both the wagon configuration and the stroller configuration may comprise child harnesses to safely carry children.

In the embodiment of the child carrying device 100, the support frame 10 comprises a handle 11 and a seat frame 15 connected with the handle 11. The handle 11 may be a U-shaped tubular structure as shown. The handle 11 configured to push the child carrying device 100 in the stroller configuration.

The seat frame 15 may be installed within the handle 11 and may be arranged in the same plane. The handle 11 has a stroller locked position and a wagon locked position. In this embodiment, a plurality of fixed connectors to connect the handle 11 and the seat frame 15 to rigidly connect them relative to each other.

In one embodiment, the conversion locking assembly comprises a conversion lock release 31, a first cable 32 connected to the conversion lock release 31, a reset block 37, a wagon lock pin connected to the reset block 37, a second pull wire 35 connected to the reset block 37, and a support frame locking member 36 connected to the second pull wire 35; the wagon lock pin 34 and the support frame locking member 36 are installed on the handle.

The folding assembly 20 is slidingly and rotatably connected to the support frame 10 with connecting member 21. The folding assembly 20 comprises a front leg tube 22, a rear leg tube 23, a linkage tube, and connecting member 21 slidably arranged on the handle 11.

The front leg tube 22, the rear leg tube 23 are pivotally connected to the connecting member 21 to allow folding of the folding assembly 20 and adjustment of the wheelbase of the child carrying device 100 as the child carrying device is converted between the wagon configuration and the stroller configuration. The linkage bar 24 is pivotally connected to each of the support frame 10, the front leg tube 22, and the folding sliding tube 25. The folding sliding tube 25 is also pivotally connected between the linkage bar 24 and the rear leg tube 23.

The connecting member 21 defines an aperture and is slidably connected to the handle 11 that is received within the aperture.

In this embodiment, the connecting member 21 includes a sliding part 215, a mounting part 216 connected to the sliding part 215, and a hinge 217 connected to the sliding part 215 and the mounting part 216. The sliding part 215 is sleeved on the outside of the handle 11, and the sliding part 215 is slidably arranged around the handle 11 and the mounting part 216 is hinged by hinge 217 to the sliding part 215 thus configured to convert the child carrying device 100 from the stroller configuration to the wagon configuration. The support frame 10 may be slid and rotated relative to the folding assembly to facilitate the conversion.

In the embodiment in the figures, the hinge 217 is connected to the front leg tube 22 and the mounting part 216 is relatively fixed to the front leg tube 22, thereby ensuring that the front leg tube 22 can rotate relative to the sliding part 215. The hinge 217 is connected and fixed to the mounting portion 216 and the rear leg tube 23 to ensure that the rear leg tube 23 can rotate relative to the connecting member 21.

Furthermore, the connecting member 21 is provided with a wagon locking slot 211. The wagon locking slot 211 may be a rectangular groove-like structure, a cylindrical slot, a semicircular slot, or other shape and receive a complementary shaped locking pin. The wagon locking slot 211 is used to fix the connecting member 21 in the wagon position of the handle 11.

The front leg tube 22 is connected to the connecting member 21. The front leg tube 22 is arranged on the side of the connecting member 21 away from the handle 11. The front leg tube 22 extends in a long strip shape; the rear leg tube 23 is hinged to the connecting member 21, and the rear leg tube 23. The rear leg tube 23 is arranged on the side of the connecting member 21 close to the handle 11, and the rear leg tube 23 is elongated; understandably, the connecting member 21 is relatively slidably arranged on both sides of the handle 11, and the two ends of the front leg tube 22 are hinged to the connecting member 21. Two ends of the rear leg tube 23 are hinged to the connecting members 21 on both sides. The front leg tube 22 and the rear leg tube 23 are provided with rollers at one end away from the support frame 10 to facilitate overall movement. Further, a stroller locking seat 225 is provided on the front leg tube 22, and the stroller locking seat 225 is connected to the front leg tube 22.

FIG. 6A depicts the stroller seat supports for configuring the stroller seat in the stroller configuration of the child carrying device. In an embodiment, the stroller seat support 40 comprises at least one strap that extends between two side tube of the support frame 10. The stroller seat support may additionally comprise a fabric cover support strap 44 that conforms the fabric cover 45 into a stroller seat shape such as by defining the footrest 46. In the embodiment shown in FIG. 6A, the stroller seat support comprises a first strap 41 connected to a first frame member 11L and a second strap 42 connected to a second frame member 11R. The frame members may be parts of the handle 11, the seat frame 15, or both. The straps may be connected by buckle such as buckle 43, hook and loop connectors, zippers, buttons, hooks, other connectors, or a combination thereof. The stroller seat support may also be constructed by folding frame members or panels. The frame members may be folded and locked to form the stroller seat or the wagon bed as desired.

The invention claimed is:

1. A child carrying device, comprising:
a support frame comprising a handle frame and a seat frame;
a folding assembly comprising a connecting member slidingly connecting the support frame to the folding assembly, a hinge joint rotatably connecting the connecting member to the folding assembly, a front leg tube, and a rear leg tube, wherein rotating the connecting member relative to the rear leg tube and sliding the support frame relative to the connecting member enables converting the child carrying device between a stroller configuration to a wagon configuration.

2. The child carrying device of claim 1, comprising a linkage bar hingedly connected between the front leg tube and the support frame, and a sliding tube hingedly connected between the linkage bar and the rear leg tube.

3. The child carrying device of claim 2, wherein the front leg tube comprises a stroller locking seat for receiving the support frame in the stroller configuration.

4. The child carrying device of claim 2, wherein one end of the linkage bar is pivotally connected to the support frame, the other end of the linkage bar is pivotally connected to the sliding tube, and the front leg tube is pivotally connected to the linkage bar between the support frame and the sliding tube.

5. The child carrying device of claim 2, wherein a folding sliding connector slidingly connects the sliding tube to the rear leg tube; the sliding connector and the rear leg tube are hinged, so the sliding connector is slidably arranged on the folding sliding tube.

6. The child carrying device of claim 5, wherein the folding sliding connector is provided with a folding button, the folding button is used to control the folding slider connector and the folding sliding tube state.

7. The child carrying device of claim 1, comprising a lock assembly configured to lock the support frame to a locking seat in the stroller configuration and lock the support frame to the connecting member in the wagon configuration.

8. The child carrying device of claim 7, wherein the lock assembly is at least partially within the support frame.

9. The child carrying device of claim 8, wherein the connecting member is provided with a wagon locking slot and a wagon locking pin is correspondingly locked in the wagon locking slot.

10. The child carrying device of claim 8, wherein we a stroller holder is slidably arranged on the handle, and an elastic member is arranged between the stroller holder and the handle.

11. The child carrying device of claim 1, wherein the handle and the seat frame are connected in a parallel orientation.

12. The child carrying device of claim 1, comprises a locking assembly comprising a conversion lock release, a first cable connected to the conversion lock release, a reset piece, a wagon lock pin connected to the reset piece, a wagon lock pin connected to the top seat, a second pull wire connected to the top seat, and a support frame locking member connected to the second pull wire; the wagon lock pin is installed on the handle In the wagon locking position, the trolley holder is installed at the trolley locking position of the handle.

13. The child carrying device of claim 1, wherein the connecting member comprises a sliding part, a mounting part connected to the sliding part, and a hinge connected to the mounting part.

14. The child carrying device of claim 13, wherein the sliding part defines and aperture and the sliding part is slidably arranged on the handle, the front leg tube is connected with the mounting part, and the rear leg tube is hinged with the hinge.

15. The child carrying device of claim 1, wherein the child carrying device further comprises a pull handle and one end of the pull handle is connected on the folding assembly.

16. The child carrying device according to claim 1, wherein the handle is arranged in a U-shaped tubular structure, the seat frame is arranged in a rectangular ring structure, and the handle is connected to the seat frame.

* * * * *